(12) United States Patent
Suciu et al.

(10) Patent No.: US 9,297,270 B2
(45) Date of Patent: Mar. 29, 2016

(54) GAS TURBINE ENGINE DRIVING MULTIPLE FANS

(75) Inventors: Gabriel L. Suciu, Glastonbury, CT (US); Alan H. Epstein, Lexington, MA (US); Wesley K. Lord, South Glastonbury, CT (US); Michael E. McCune, Colchester, CT (US); Brian D. Merry, Andover, CT (US)

(73) Assignee: United Technologies Corporation, Hartford, CT (US)

( * ) Notice: Subject to any disclaimer, the term of this patent is extended or adjusted under 35 U.S.C. 154(b) by 1048 days.

(21) Appl. No.: 13/407,836

(22) Filed: Feb. 29, 2012

(65) Prior Publication Data

US 2013/0223991 A1    Aug. 29, 2013

(51) Int. Cl.
*F02C 7/36* (2006.01)
*F01D 15/12* (2006.01)
*F02C 3/107* (2006.01)

(52) U.S. Cl.
CPC .............. *F01D 15/12* (2013.01); *F02C 3/107* (2013.01); *F02C 7/36* (2013.01); *F05D 2220/36* (2013.01); *F05D 2240/40* (2013.01); *F05D 2260/4031* (2013.01)

(58) Field of Classification Search
CPC .............. F02K 3/00; F02K 3/02; F02K 3/04; F02K 3/06; F02C 7/36; F02C 3/107; F02C 3/113; F01D 15/12

USPC .................... 60/226.1, 39.163, 236
See application file for complete search history.

(56) References Cited

U.S. PATENT DOCUMENTS

| | | | |
|---|---|---|---|
| 3,054,577 A * | 9/1962 | Wolf et al. | 60/226.1 |
| 4,149,374 A * | 4/1979 | Barchenko | F02C 7/36 60/225 |
| 5,161,369 A | 11/1992 | Williams | |
| 6,792,745 B2 | 9/2004 | Wojciechowski | |
| 7,107,756 B2 * | 9/2006 | Rolt | 60/224 |
| 7,752,834 B2 | 7/2010 | Addis | |
| 8,015,796 B2 | 9/2011 | Babu et al. | |
| 2004/0025493 A1 * | 2/2004 | Wojciechowski | 60/224 |
| 2008/0098719 A1 | 5/2008 | Addis | |
| 2009/0229243 A1 | 9/2009 | Guemmer | |

OTHER PUBLICATIONS

International Search Report for International Application No. PCT/US2013/026576 completed Jun. 24, 2013.
International Preliminary Report on Patentability for Application No. PCT/US2013/026576 mailed Sep. 12, 2014.

* cited by examiner

*Primary Examiner* — Edward Look
*Assistant Examiner* — Danielle M Christensen
(74) *Attorney, Agent, or Firm* — Carson, Gaskey & Olds, PC

(57) ABSTRACT

A gas turbine engine includes a core engine with a compressor section, a combustor and a turbine. The turbine drives an output shaft, and the output shaft drives at least four gears. Each of the at least four gears extends through a drive shaft to drive an associated fan rotor.

19 Claims, 6 Drawing Sheets

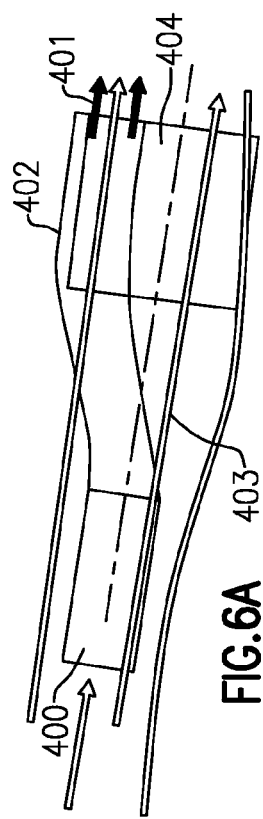
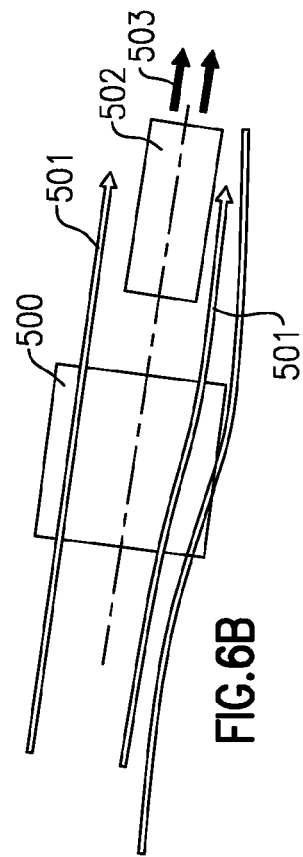
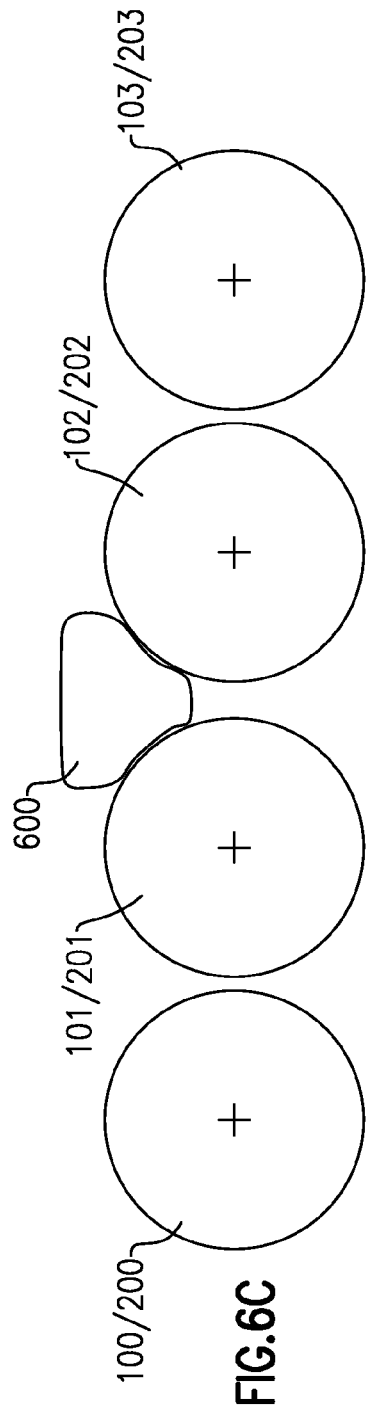

GAS TURBINE ENGINE DRIVING MULTIPLE FANS

BACKGROUND

Gas turbine engines are known, and typically include a fan delivering air into a compressor. The air is compressed in the compressor, and delivered into a combustion section where it is mixed with fuel and ignited. Products of the combustion pass downstream over turbine rotors, which in turn drive the compressor and fan.

Fan rotors are becoming increasingly large in diameter. This increase presents challenges with regard to operation and packaging. Thus, it has been proposed to drive a plurality of fan rotors from a single gas turbine engine core. The enlargement of fan diameter has increased with the recent development of a gear reduction driving the fan from the turbine rotor. The fans typically drive air through both a bypass duct, and into the compressor. A bypass ratio is defined as the volume of air delivered into the bypass duct as propulsion, compared to the volume of air delivered into the compressor. The bypass ratio has become larger as the fan diameter has become larger.

It has been proposed to drive a plurality of smaller fan rotors from a single core engine. Typically these proposals have only driven two fan rotors. One proposal has been to drive as many as four fan rotors from a single core engine, however, the transmission for doing so would not share the power to the fan rotors in an efficient manner.

SUMMARY

In a featured embodiment, a gas turbine engine has a core engine including a compressor section, a combustor and a turbine. The turbine drives an output shaft. The output shaft drives at least four gears, each of the at least four gears extending through a drive shaft to drive an associated fan rotor.

In another embodiment according to the previous embodiments, the output of the core engine drives a pair of bevel gears. Each of the at least four gears are driven by at least one of the pair of bevel gears.

In another embodiment according to the previous embodiments, the pair of bevel gears rotate together. Each of the pair of bevel gears drives at least two of the at least four gears.

In another embodiment according to the previous embodiments, the at least four gears are bevel gears.

In another embodiment according to the previous embodiments, the output shafts drive an output shaft bevel gear. The output shaft bevel gears engage fan rotor bevel gears which in turn drive fan rotors.

In another embodiment according to the previous embodiments, the output shaft of the gas turbine engine also drive a fifth fan delivering air into the compressor section.

In another embodiment according to the previous embodiments, the fifth fan is driven by a shaft upstream of the pair of bevel gears.

In another embodiment according to the previous embodiments, the at least four gears and shafts are positioned downstream of the fan rotors.

In another embodiment according to the previous embodiments, the output shafts are positioned upstream of the fan rotors.

In another embodiment according to the previous embodiments, an exhaust of the core engine exhausts air through a duct. An exhaust from the at least four fan rotors is maintained substantially separate of the exhaust from the core engine.

In another embodiment according to the previous embodiments, the exhaust of the core engine is positioned upstream of the fan rotors.

In another embodiment according to the previous embodiments, the exhaust of the core engine is positioned downstream of the fan rotors.

In another embodiment according to the previous embodiments, an exhaust of the core engine exhausts air through a duct. An exhaust from the at least four fan rotors is maintained substantially separate of the exhaust from the core engine.

In another embodiment according to the previous embodiments, the output shafts are positioned upstream of the fan rotors.

In another embodiment according to the previous embodiments, the at least four gears and shafts are positioned downstream of the fan rotors.

In another embodiment according to the previous embodiments, the output shaft of the gas turbine engine also drives a fifth fan delivering air into the compressor section.

In another embodiment according to the previous embodiments, the fifth fan is driven by a shaft upstream of the pair of bevel gears.

In another embodiment according to the previous embodiments, the output shaft drives an output shaft bevel gear. The output shaft bevel gear engages fan rotor bevel gears which in turn drive fan rotors.

In another embodiment according to the previous embodiments, an exhaust of the core engine is positioned upstream of the fan rotors.

In another embodiment according to the previous embodiments, an exhaust of the core engine is positioned downstream of the fan rotors.

These and other features of the invention will be better understood from the following specification and drawings, the following of which is a brief description.

BRIEF DESCRIPTION OF THE DRAWINGS

FIG. 6A shows a feature of any of these embodiments.
FIG. 6B shows an alternative to the FIG. 6A arrangement.
FIG. 6C shows a feature of either the FIG. 6A or 6B embodiment.

DETAILED DESCRIPTION

Figure 1:
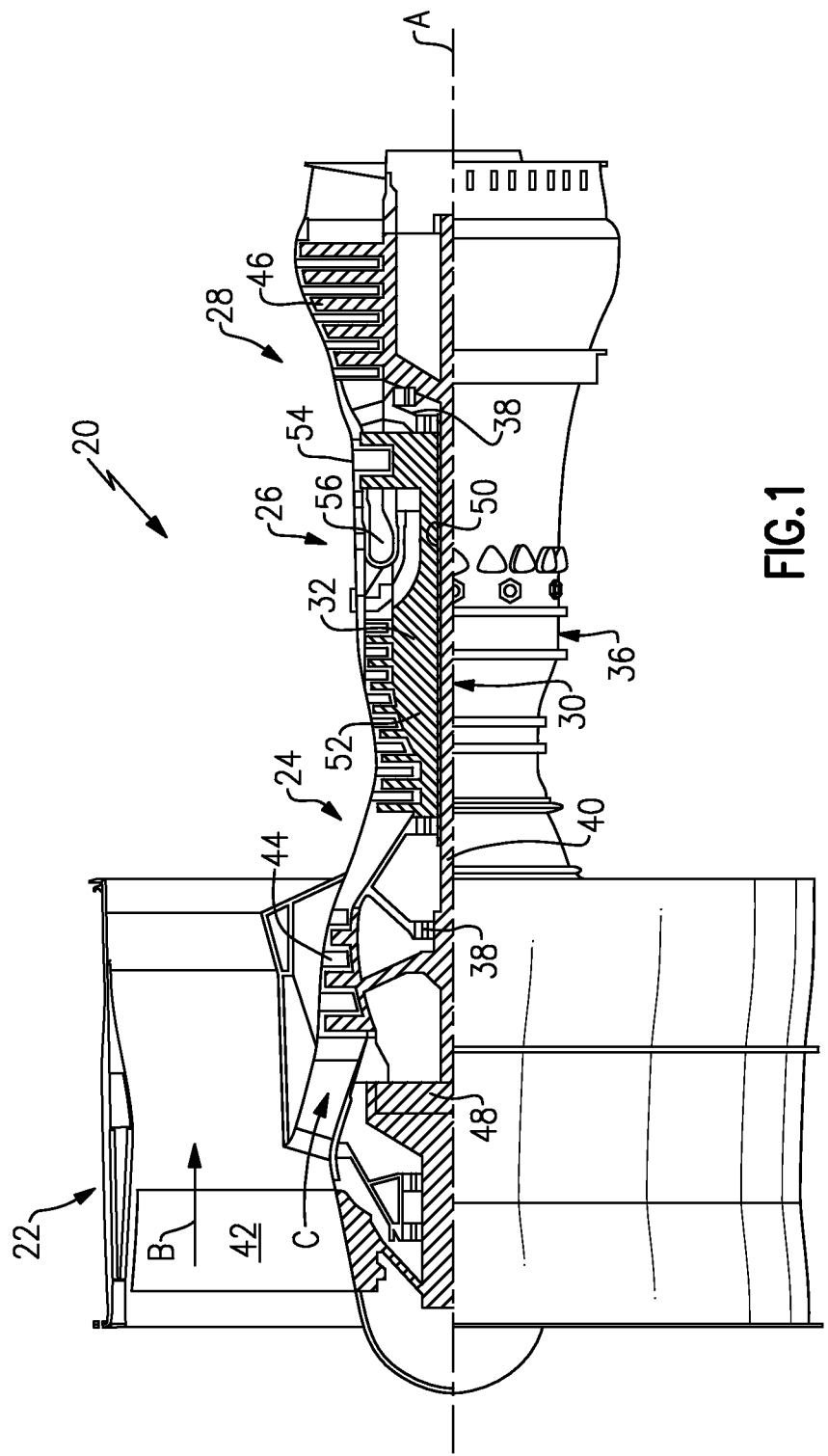
FIG. 1 schematically shows a prior art gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown), among other systems or features. The fan section 22 drives air along a bypass flowpath B while the compressor section 24 drives air along a core flowpath C for compression and communication into the combustor section 26, then expansion through the turbine section 28. Although depicted as a turbofan gas turbine engine in the disclosed non-limiting embodiment, it should be understood that the concepts described herein are not limited to use with turbofans as the teachings may be applied to other types of turbine engines including three-spool architectures.

The engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that interconnects a fan 42, a low pressure (or first) compressor 44 and a low pressure (or first) turbine 46. The inner shaft 40 is connected to the fan 42 through a geared architecture 48 to drive the fan 42 at a lower speed than the low speed spool 30. The high speed spool 32 includes an outer shaft 50 that interconnects a high pressure (or second) compressor 52 and high pressure (or second) turbine 54. A combustor 56 is arranged between the high pressure compressor 52 and the high pressure turbine 54. The inner shaft 40 and the outer shaft 50 are concentric and rotate via bearing systems 38 about the engine central longitudinal axis A which is collinear with their longitudinal axes. As used herein, a "high pressure" compressor or turbine experiences a higher pressure than a corresponding "low pressure" compressor or turbine.

The core airflow is compressed by the low pressure compressor 44, then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion.

Figure 2:
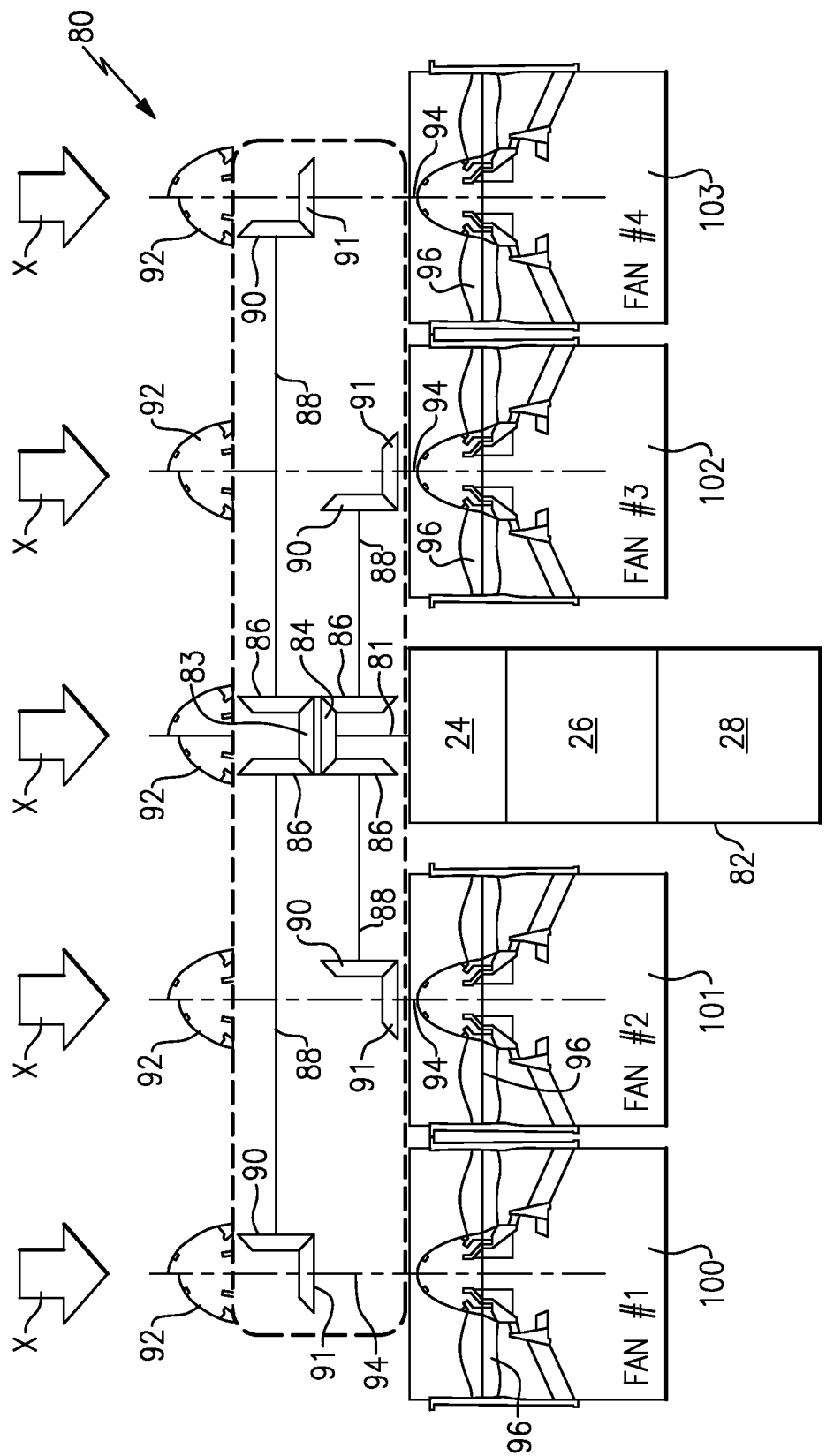
FIG. 2 shows a first embodiment.

FIG. 2 shows a gas turbine engine 80 having a single core engine 82 shown schematically. The core engine includes at least a compressor 44, a combustor 26 and a turbine 28 of the type shown in FIG. 1, as may be generally known. The core 82 drives a shaft 81 which in turn drives a gear combination 83 and 84. Gears 83 and 84 are shown as bevel gears which rotate together to drive four bevel gears 86. Each of the bevel gears 86 drives a shaft 88 that in turn drives a bevel gear 90. The bevel gears 90 drive bevel gears 91, which in turn drive shafts 94. Nose cones 92 are positioned forwardly in front of four fans 100, 101, 102 and 103. In addition, a cone 92 is positioned forwardly of an intake into a compressor section of the gas turbine engine 82. Airflow in this embodiment flows in the direction X across fan rotors 96 in each of the fans 100, 101, 102 and 103. By utilizing the direct drive taken from the bevel gears, and delivered to each of the four fan rotors, this embodiment efficiently and adequately drives each of the fan rotors 96. It should be understood that the drive is shown schematically and would typically include bearings, supports, etc.

Figure 3:
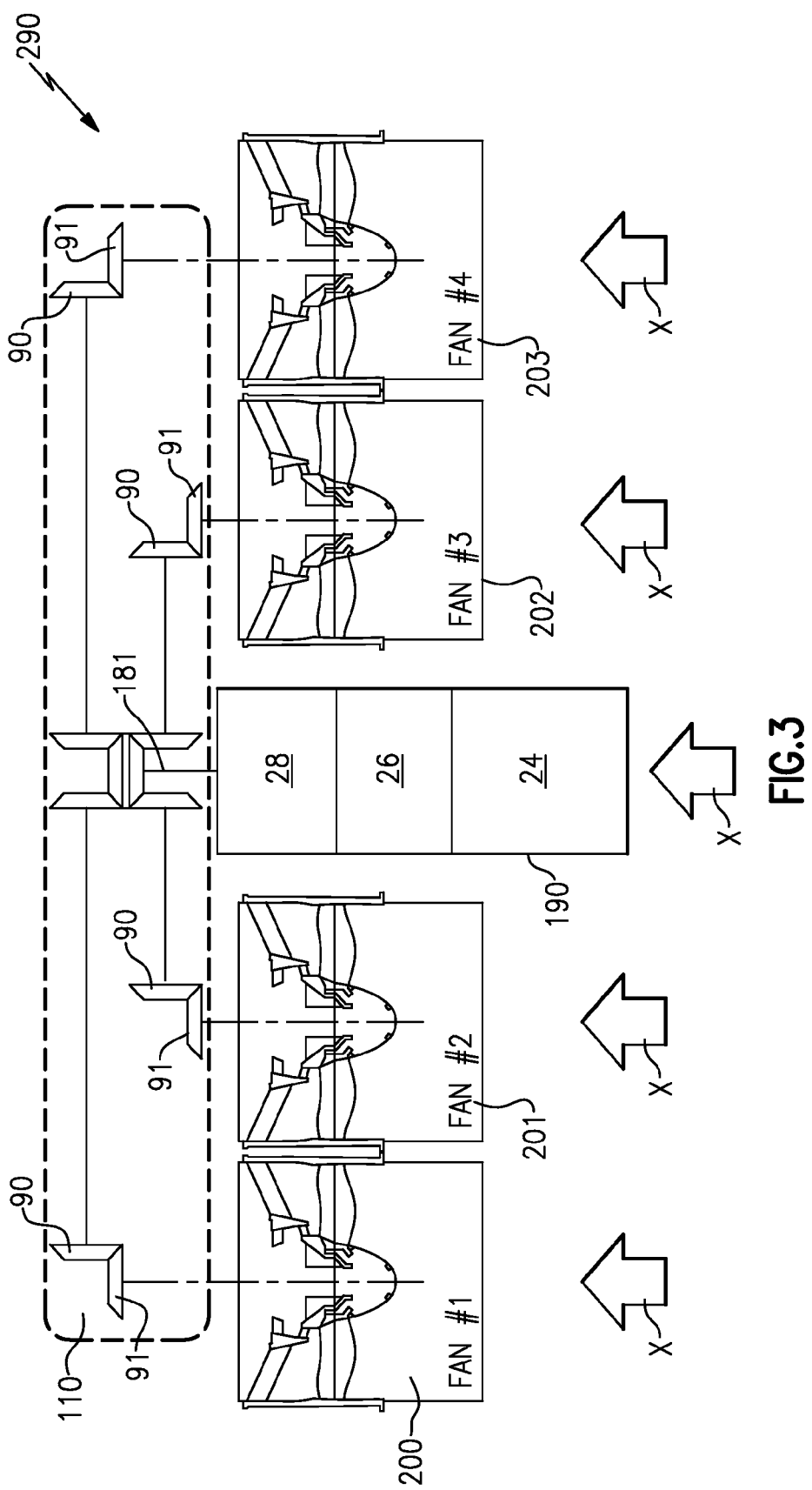
FIG. 3 shows a second embodiment.
Figure 4A:
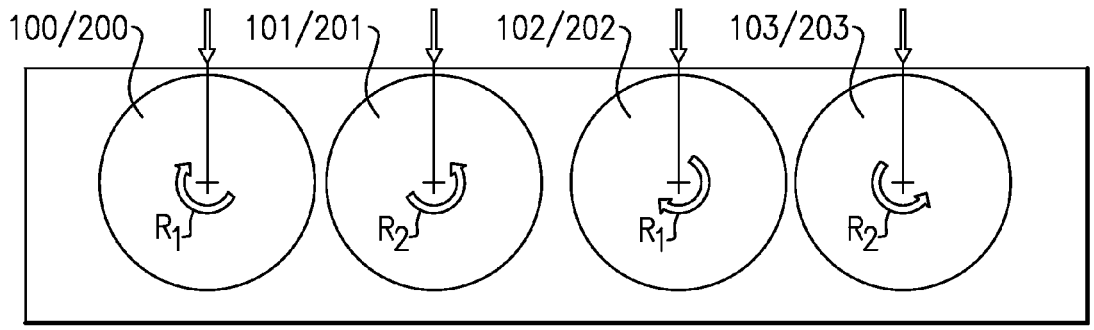
FIGS. 4A-4D show various direction of rotation options for either of the foregoing embodiments.
Figure 4B:
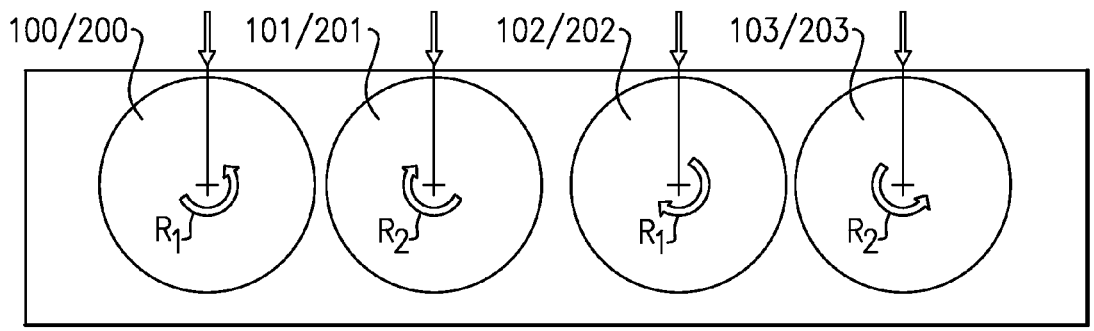
Figure 4C:
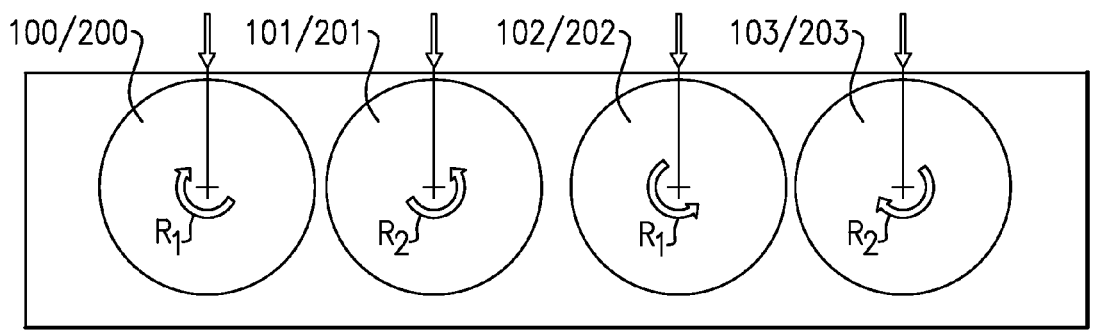
Figure 4D:
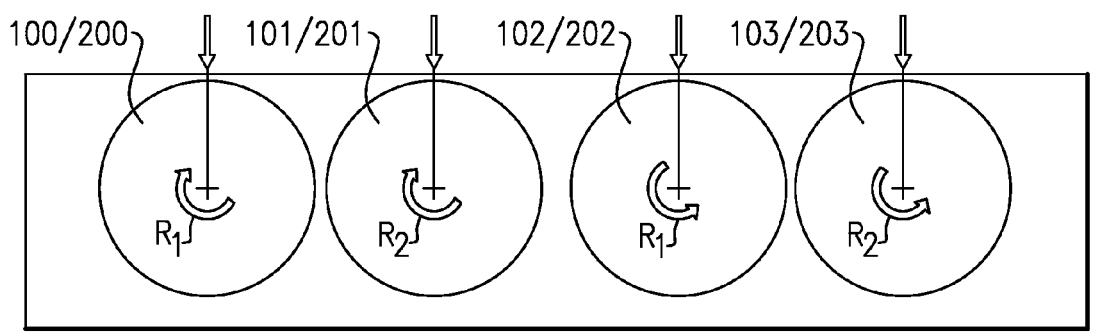

FIG. 3 shows an embodiment 290 that is somewhat similar to the embodiment 80 of FIG. 2. However, the gas turbine engine 290 takes air in the direction X into its compressor section 24 and drives the output shaft 181 to drive the fans 200, 201, 202 and 203 through a gear transmission 110, which is shown to be quite similar to that of FIG. 2. However, in this embodiment the transmission 110 and fan rotors 200, 201, 202, and 203 are provided at the downstream (with respect to airflow) of the core 190. For example, the transmission 110 and fan rotors 200, 201, 202, and 203 may be provided adjacent the low pressure turbine 46 of the turbine section 28. Essentially, this embodiment simply reverses the location of the gear transmission relative to the fan rotors. As shown in FIG. 3, the transmission 110 is on an opposed side of the fan rotor, or in the path of the air downstream of the fan rotor. In contrast, as shown in FIG. 2, the transmission is positioned intermediate the nose cones 92 and the fan rotors, and upstream of the fan rotors in the airflow direction.

FIGS. 4A-4D shows the feature that the fans 100/200, 101/201, 102/202, and 103/203 can rotate in directions R1 or R2 as shown. However, a worker of ordinary skill in the art would recognize how to achieve a desired rotation for the fan rotors by selectively arranging the gear transmissions.

Figure 5:
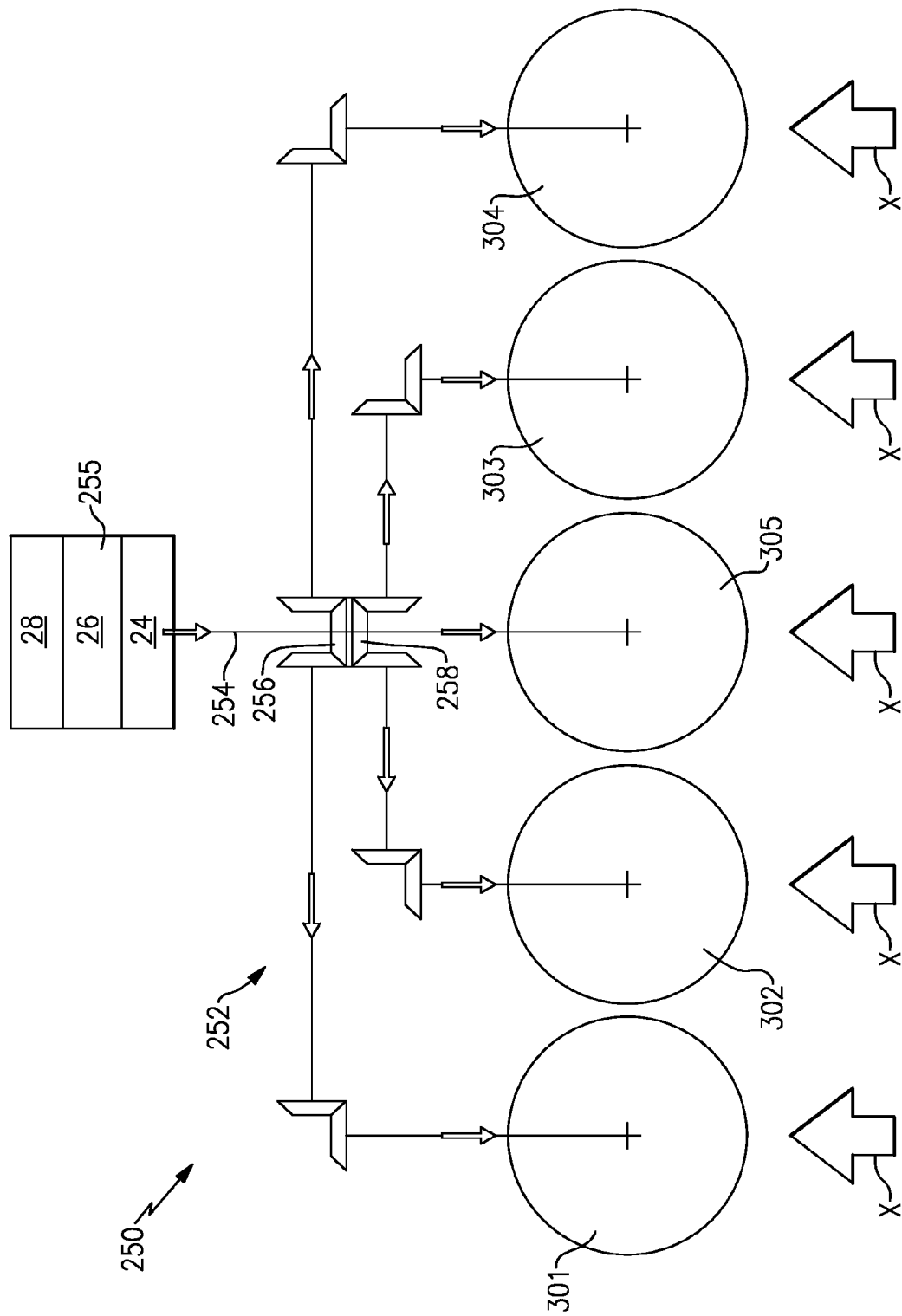
FIG. 5 shows a third embodiment.

FIG. 5 shows an embodiment 250 wherein the output 254 from a gas turbine engine core 255 drives bevel gears 256 and 258 to drive a gear transmission 252 which is similar to the FIG. 1 or FIG. 2 embodiments. The gear transmission 252 in turn drives five fan rotors 301, 302, 303, 304 and 305. The fan rotor 305 delivers the air into the core engine 255 in the direction X, and is shown schematically. As shown, the fan rotor 305 is driven by a shaft 311, upstream of the bevel gears 256/258.

The arrangements as set forth above will be operable to drive each of the fan rotors with a shared power, and such that the speed of the fan rotors can be controlled.

FIG. 6A shows a feature wherein the core engine 400 delivers its exhaust gas through a duct 402 as exhaust flow 401. The four or more fans 404 deliver propulsion air as flow 403, which is separate from the exhaust flow 401.

FIG. 6A shows the core 400 being upstream of the fan 404.

FIG. 6B shows the four or more fans 500 being upstream of the core 502. Again, the propulsive flow 501 from the fans 500 is separate from the exhaust flow 503 from the core 502.

FIG. 6C shows one possible arrangement of the core exhaust duct 600 relative to the fan rotors 100/200, 101/201, 102/201 and 103/203. As shown, the core exhaust may be maintained separate from the bypass output of the fans 100/200, 101/201, 102/202 and 103/203.

A worker of ordinary skill in this art would recognize that certain modifications would come within the scope of this invention. For that reason, the following claims should be studied to determine the true scope and content of this invention.

What is claimed is:

1. A gas turbine engine comprising:
a core engine including a compressor section, a combustor and a turbine, said turbine driving an output shaft;
said output shaft driving at least four gears, each of said at least four gears extending to a separate drive shaft to drive an associated one of at least four fan rotors; and
said separate drive shafts each extending from one of said at least four gears to drive a fan drive shaft which in turn drives said associated fan rotor; wherein said output of said core engine drives a pair of bevel gears, and each of said at least four gears being driven by at least one of said pair of bevel gears.

2. The gas turbine engine as set forth in claim 1, wherein said pair of bevel gears rotate together, with each of said pair of bevel gears driving at least two of said at least four gears.

3. The gas turbine engine as set forth in claim 2, wherein said at least four gears are bevel gears.

4. The gas turbine engine as set forth in claim 3, wherein said separate drive shafts drive an output shaft bevel gear, and said output shaft bevel gears engage fan rotor bevel gears which in turn drive fan rotors.

5. The gas turbine engine as set forth in claim 4, wherein said output shaft of said gas turbine engine also driving a fifth fan delivering air into the compressor section.

6. The gas turbine engine as set forth in claim 5, wherein said fifth fan is driven by a shaft upstream of said pair of bevel gears.

7. The gas turbine engine as set forth in claim 4, wherein said at least four gears and said separate drive shafts are positioned downstream of the fan rotors.

8. The gas turbine engine as set forth in claim 4, wherein said separate drive shafts are positioned upstream of the fan rotors.

9. The gas turbine engine as set forth in claim 4, wherein an exhaust of said core engine exhausts air through a duct, and an exhaust from said at least four fan rotors is maintained substantially separate of said exhaust from said core engine.

10. The gas turbine engine as set forth in claim 9, wherein said exhaust of said core engine is positioned upstream of said fan rotors.

11. The gas turbine engine as set forth in claim 9, wherein said exhaust of said core engine is positioned downstream of said fan rotors.

12. The gas turbine engine as set forth in claim 1, wherein an exhaust of said core engine exhausts air through a duct, and an exhaust from said at least four fan rotors is maintained substantially separate of said exhaust from said core engine.

13. The gas turbine engine as set forth in claim 1, wherein said separate drive shafts are positioned upstream of the fan rotors.

14. The gas turbine engine as set forth in claim 1, wherein said at least four gears and said separate drive shafts are positioned downstream of the fan rotors.

15. The gas turbine engine as set forth in claim 1, wherein said output shaft of said gas turbine engine also driving a fifth fan delivering air into the compressor section.

16. The gas turbine engine as set forth in claim 15, wherein said fifth fan is driven by a shaft upstream of said pair of bevel gears.

17. The gas turbine engine as set forth in claim 1, wherein said separate drive shafts each drive an output shaft bevel gear, and said output shaft bevel gears engages fan rotor bevel gears which in turn drive fan rotors.

18. The gas turbine engine as set forth in claim 1, wherein an exhaust of said core engine is positioned upstream of said fan rotors.

19. The gas turbine engine as set forth in claim 1, wherein an exhaust of said core engine is positioned downstream of said fan rotors.

* * * * *